United States Patent
Kermani

(10) Patent No.: US 7,475,334 B1
(45) Date of Patent: Jan. 6, 2009

(54) METHOD AND SYSTEM FOR ABSTRACTING ELECTRONIC DOCUMENTS

(75) Inventor: Bahram G. Kermani, Whitehall, PA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 839 days.

(21) Appl. No.: 09/487,522

(22) Filed: Jan. 19, 2000

(51) Int. Cl.
*G06F 17/00* (2006.01)
(52) U.S. Cl. .................. 715/229; 715/255; 707/203
(58) Field of Classification Search .............. 715/500.1, 715/501.1, 511, 229, 255; 707/203; 704/1
See application file for complete search history.

(56) References Cited

U.S. PATENT DOCUMENTS

| | | | |
|---|---|---|---|
| 5,434,962 A | 7/1995 | Kyojima et al. | 395/145 |
| 5,491,760 A | 2/1996 | Withgott et al. | 382/203 |
| 5,638,543 A | 6/1997 | Pedersen et al. | 395/751 |
| 5,802,529 A | 9/1998 | Nakatsuyama et al. | 707/513 |
| 5,819,260 A * | 10/1998 | Lu et al. | 707/3 |
| 5,893,109 A | 4/1999 | DeRose et al. | 707/104 |
| 6,205,456 B1 * | 3/2001 | Nakao | 715/531 |
| 6,289,304 B1 * | 9/2001 | Grefenstette | 704/9 |
| 6,334,132 B1 * | 12/2001 | Weeks | 707/101 |
| 6,401,086 B1 * | 6/2002 | Bruckner | 707/4 |
| 6,460,036 B1 * | 10/2002 | Herz | 707/10 |
| 6,557,042 B1 * | 4/2003 | He et al. | 709/231 |
| 6,789,230 B2 * | 9/2004 | Katariya et al. | 715/531 |
| 2001/0016809 A1 * | 8/2001 | Ishikawa et al. | 704/10 |

\* cited by examiner

*Primary Examiner*—Rachna Desai

(57) ABSTRACT

A method and computer implemented system may be used to abstract an electronic document. A user is prompted to select at least one abstracted version of the electronic document. A set of instructions is selected for abstracting the electronic document, and the abstracted version is created by executing the selected set of instructions. The instructions may be generic or particularized to the electronic document. The abstracted version of the electronic document is then outputted in a predetermined format.

15 Claims, 3 Drawing Sheets

METHOD AND SYSTEM FOR ABSTRACTING ELECTRONIC DOCUMENTS

FIELD OF THE INVENTION

The present invention relates to electronic documents, and more specifically to a method and system for abstracting an electronic document to at least one level of abstraction.

DESCRIPTION OF THE RELATED ART

Electronic documents comprise a vast portion of all documents created and transferred in today's world. For example, electronic mail, news releases, text books, encyclopedias, articles, studies, and novels, to name a few, are widely disseminated as electronic documents. These documents are created as low level texts, those texts that have not been manipulated at all, i.e, they exist in their original full text form with all of their grammatical detail stored in an electronic format.

Today's increasingly complex world often places significant time constraints on individuals, particularly in today's corporate world. Thus, it is often inefficient or impractical for an individual to read an entire electronic document. As speed readers have long recognized, an individual often does not have to read all of the details of a document to discern the desired information. For example, many speed readers are taught to focus on groups of words, not individual words, in order to discern a word cluster's meaning and to progress down a page of text while reading instead of left to right across a page of text. Many people, however, do not know how to utilize these techniques or are not capable of using these techniques.

Several software packages are available that teach speed reading. Also, software packages exist that display electronic documents in varied formats. Some software packages utilize Rapid Serial Visual Presentation (RSVP) techniques to present electronic text serially at rapid speeds. The full low level version of the text, though, is presented with RSVP techniques. Also, some software packages exist that display text to the reader using a technique called Tachistoscopic Scroll Presentation. This technique presents the full low level version of the text to the reader in flashes of text in a conventional left to right reading manner in order to train users to read faster.

Systems have also been developed that create summaries or abstracts of an electronic document. One such example is disclosed in Pedersen et al. (U.S. Pat. No. 5,638,543). Pedersen discloses a method of scoring regions of and electronic document according to importance based upon predetermined parameters contained in a computer program. An abstract of the electronic document may be created based upon the scores.

There is still a need, though, for a flexible method of abstracting and electronic document. The level at which one chooses to read an electronic document may depend on the nature of the underlying text. For example, one may choose to read a scientific text at its full text level because of the apparent significance of each word. The same individual, however, may choose to read an electronic mail or a newspaper article at a level of abstraction in order to increase the speed at which the document can be read. Conversely, a person may be interested in particular subject matter contained in an electronic document covering a broad interspersed subject matter. Thus, there is a need for a new method and system for abstracting electronic documents that allows a reader to choose between various levels of abstraction for electronic documents, thereby permitting that reader to read the electronic document according to his or her personal needs, preferences or time constraints.

SUMMARY OF THE INVENTION

The present invention is a method of abstracting an electronic document. A user of the electronic document is prompted to select at least one abstracted version of the electronic document. A set of instructions for abstracting the electronic document is selected. The selected abstracted version of the electronic document is created by executing the selected set of instructions. The selected abstracted version of the electronic document is then outputted in a predetermined format.

The above and other advantages and features of the present invention will be better understood from the following detailed description of the preferred embodiments of the invention which is provided in connection with the accompanying drawings.

DETAILED DESCRIPTION

Figure 1:
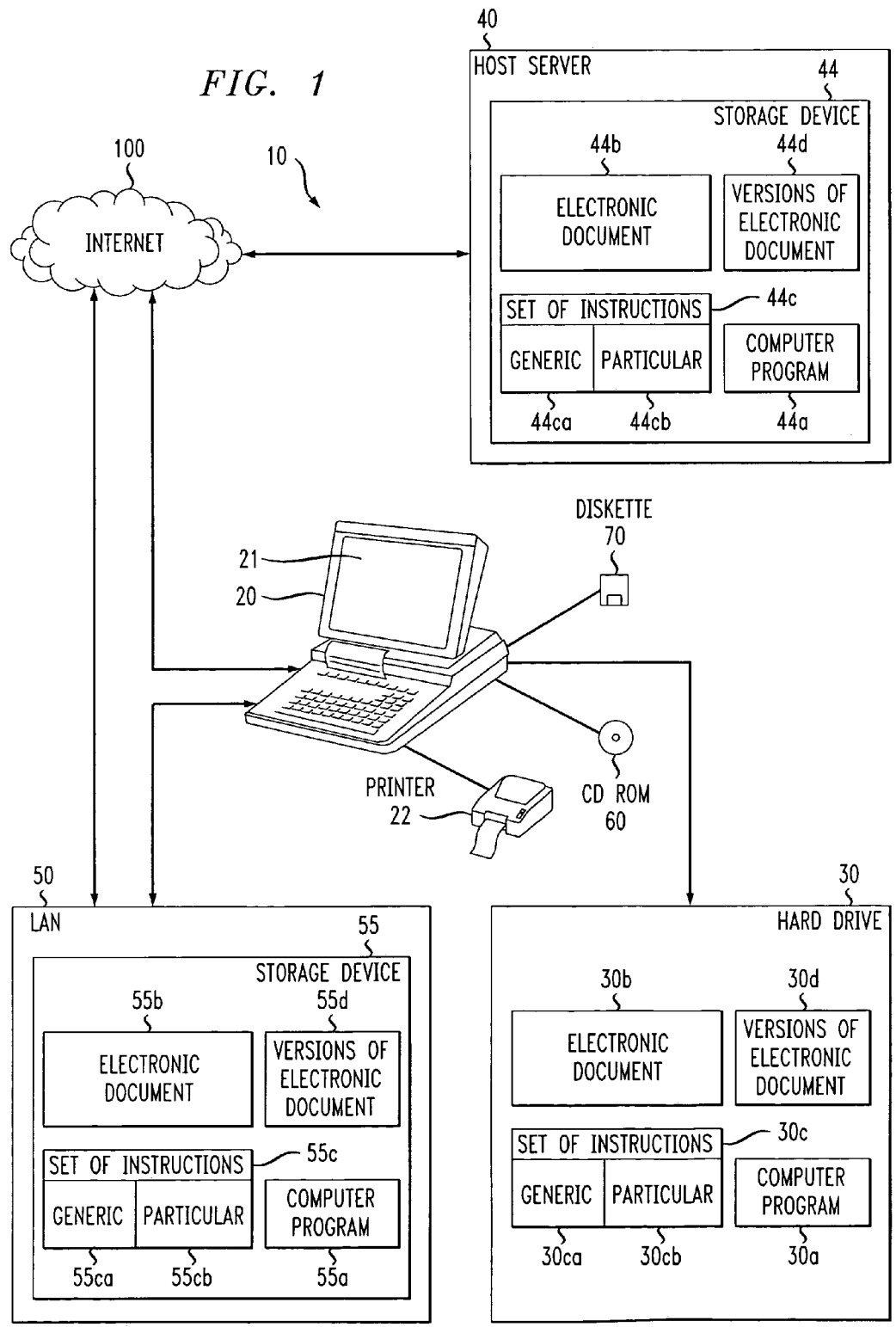
FIG. 1 is a block diagram of an exemplary system for abstracting an electronic document.
Figure 2:
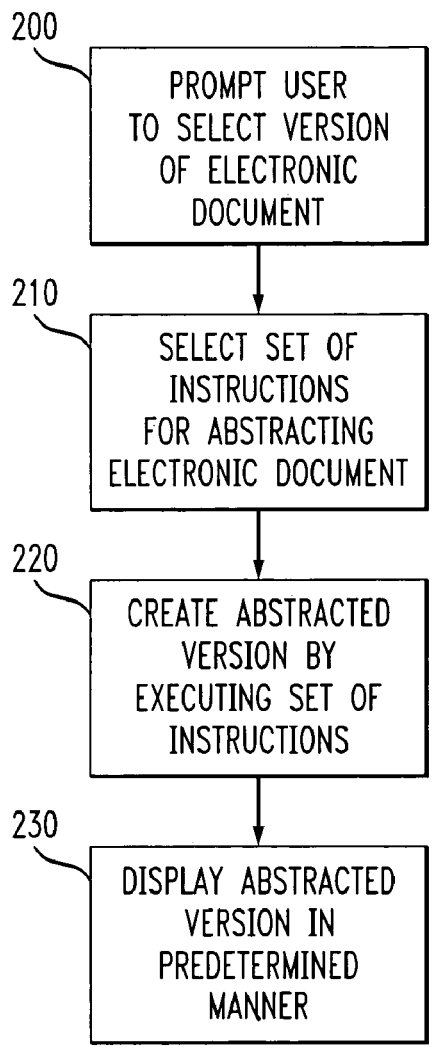
FIG. 2 is a flow chart of an exemplary method of abstracting an electronic document.

FIG. 1 shows a system 10 for abstracting an electronic document. FIG. 2 shows an exemplary method according to the invention for abstracting an electronic document. A user is prompted to select at least one abstracted version of the electronic document. A set of instruction is selected, and the abstracted version is created by executing the selected set of instructions. The abstracted version of the electronic document is then outputted in a predetermined format. The invention is particularly advantageous in that it permits users of electronic documents to select a version of the electronic document that most nearly meets the user's need for that electronic document. The invention thus facilitates both an economic and flexible use of one's time. The implementation of this method is discussed below.

Referring to FIG. 1, a conventional computer 20 of system 10 executes a computer program. The computer program 30a may be stored on a computer-readable medium encoded with computer program code for executing the steps of the method of abstracting an electronic document. The computer-readable medium for storing the computer program may be any conventional storage medium, such as hard drive 30 of computer 20. The computer program may also be stored on a remote storage device, such as storage device 55 located on local access network (LAN) 50, storage device 44 of host server 40 of system 10 or a storage device located on a wide area network. Conversely, the computer readable medium for storing the computer program 30a may be a conventional CD-ROM 60 or diskette 70.

The system 10 also includes a storage device that may be any computer-readable medium, such as hard drive 30, for storing an electronic document 30b, a set of instructions 30c for abstracting the electronic document 30b, and abstracted versions 30d of the electronic document 30b. It should be understood that the computer program 30a, electronic document 30b, set of instructions 30c, and abstracted versions 30d of the electronic document 30b need not be located on the same computer-readable medium. Any conventional computer-readable medium may be used to store the aforementioned files shown stored on hard drive 30. The medium may be remote from computer 20, such as storage device 44 or storage device 55.

Embodiments of the invention may be used to abstract electronic documents such as electronic mails (emails), word processing documents, books, articles, encyclopedias, and other documents stored in electronic form. Further, the electronic document 30b may be formatted in any conventional electronic document format. For example, the electronic document 30b may be stored as an ASCII file, Portable Data File (pdf), Word Perfect file, or the like.

FIG. 1 also shows computer 20 attached to LAN 50. LAN 50 includes a conventional storage device 55 that may have stored therein the computer program 55a implementing the method of abstracting an electronic document, an electronic document 55b, a set of instructions 55c for abstracting the electronic document 55b, and abstracted versions 55d of the electronic document 55b.

Host server 40 attached to Internet 100 may include a storage device 44 that is any conventional computer-readable medium. Storage device 44 may include an electronic document 44b, the computer program 44a for implementing the method of abstracting an electronic document, a set of instructions 44c for abstracting the electronic document 44b, and abstracted versions 44d of electronic document 44b. Internet 100 is also attached to computer 20 and LAN 50.

FIG. 2 is an exemplary embodiment of the method of abstracting an electronic document in system 10 of FIG. 1. At step 200, a user of computer 20 is prompted to select a version of the electronic document 30b for use by the user. The use may be any conventional use such as for display on monitor 21, for printing to printer 22, or for recording on diskette 70. At step 210, a set of instructions 30c is selected for abstracting electronic document 30b. At step 220, the version of the electronic document 30b selected by the user is created by executing the selected set of instructions 30c for abstracting electronic document 30b with computer program 30a. At step 230, the abstracted version of electronic document 30b is outputted in a predetermined format for use by the user. The predetermined format may be any conventional format such as outputting to monitor 21, printing to printer 22, or recording on data diskette 70 in an electronic document format. If the output device at step 230 is storage device 30, the abstracted version 30d is preferably recorded at another memory location so as to preserve non-abstracted electronic document 30b for abstracting according to a different set of instructions.

FIG. 2 shows a method of abstracting an electronic document in system 10 of FIG. 1. It should be understood that the method may be executed with reference to the other blocks of system 10, besides hard drive 30, namely host server 40 and LAN 50, as well as among the blocks of system 10. For example, a user of computer 20 may access host server 40 through Internet 100. The user may then be prompted to select a version of electronic document 44b. The set of instructions 44c for abstracting electronic document 44b may be selected, and computer program 44a may create the selected version of electronic document 44b by executing the selected set of instructions 44c. The abstracted version may then be sent in a conventional manner to computer 20 over Internet 100, where the abstracted version may be outputted to, for example, computer monitor 21.

Conversely, the electronic document 44b may be stored in storage device 44, along with instruction set 44c. The computer program may be stored in storage device 30a. The user may download the instruction set 44c and electronic document 44b from storage device 44 over Internet 100. The selected abstracted version may then be created by executing the set of instructions 44c with computer program 30a.

It should be apparent that several variations for the storage locations for the electronic document, computer program, and set of instructions are available and are within the scope of the invention. For example, the computer program 30a may be stored on hard drive 30 along with electronic document 30b. A set of instruction 40c or a set of instructions 50c may then be downloaded from a remote location for execution by computer program 30a.

In one embodiment of the invention the set of instructions 30c may include a generic set of instructions 30ca. The generic set of instructions 30ca are not specific to any particular electronic document. The generic set of instructions 30ca may be instructions for removing grammatical articles (e.g., a, an, the), removing grammatical adjectives (e.g., big, high, heavy), removing grammatical adverbs (e.g., always, very, shortly), contracting grammatical verb clauses (e.g., is not, are not, would not), abbreviating well known phrases, bodies, governments or entities (e.g., United States, Internal Revenue Service, New York), and other sets of instructions that may be executed to abstract electronic documents generally. Execution of the generic set of instructions creates an abstracted electronic document that may be read quicker than a full text version of the electronic document. One or more sets of available generic instructions 30ca may be executed on the electronic document, depending on the level of abstraction desired by the user.

Figure 3:
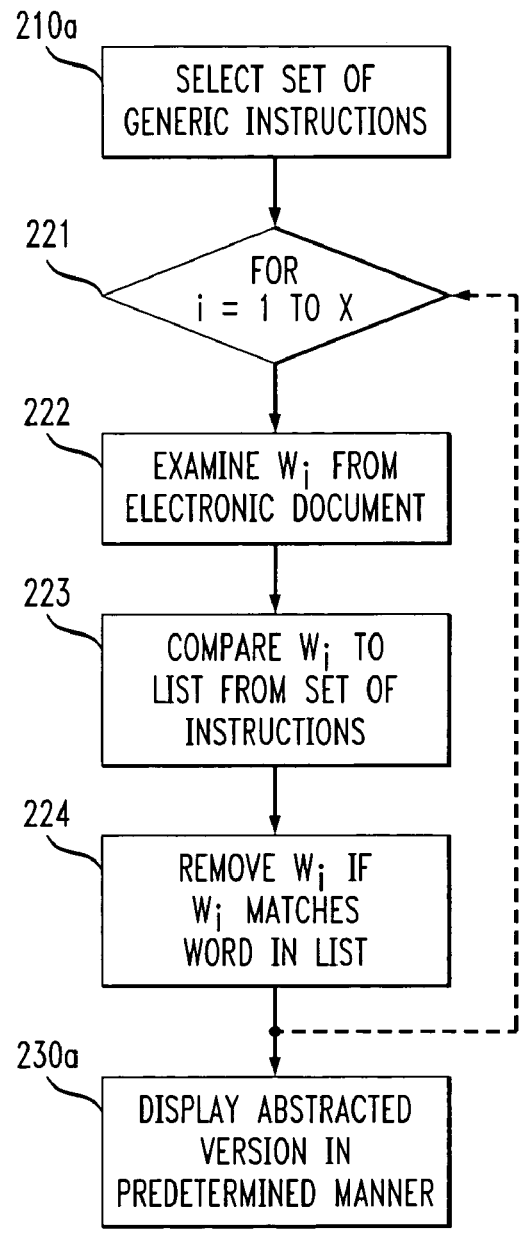
FIG. 3 is a flow chart of an exemplary method of generic abstraction of an electronic document.

FIG. 3 is a flow chart showing the creation of an abstracted version of an electronic document when a generic set of instructions is selected at step 210a. At step 221, a loop begins that is run until the end of the electronic document is reached. The end of the electronic document is represented in step 221 as "x," the total number of words in the electronic document. A word ($W_i$) of the electronic document is examined at step 222 and compared at step 223 with a stored list of words specific to the selected generic set of instructions being executed. For example, if the generic set of instructions for removing articles is selected, $W_i$ is compared with a list of articles in step 223 that may be stored in the set of instructions for removing grammatical articles. At step 224, $W_i$ is removed from the electronic document if it matches a word stored in the generic set of instructions being executed. Conversely, at step 224, words may be replaced when the set of instructions so requires, such as when the set of instructions contracts verb clauses or abbreviates words or phrases. It should be apparent that if word phrases are to be replaced, groups of words are examined using the method of FIG. 3. For example, if $W_i$ matches the word "United," then $W_{i+1}$ is examined to see if it matches the word "States," and so forth. If a match for "United States" is found, that phrase is removed and replaced with its abbreviation, namely "U.S." At step 230a, the abstracted version of the electronic document is outputted.

The generic set of instructions 30ca may be stored as a separate file 30c as shown in FIG. 1. Conversely, the computer program 30a may include the generic set of instructions. This embodiment of the invention is advantageous because the generic set of instructions are operable on electronic documents generally. Inclusion of the generic instructions in the computer program 30a alleviates the need to separately store the generic set of instructions.

The set of instructions 30c may include a set of instructions 30cb particularized to an electronic document, such as electronic document 30b. An electronic document 30b may be abstracted by removing words, sentences, paragraphs, sections and the like, thereby shortening the electronic document and allowing economic uses of the electronic document. In one embodiment of the invention, the set of instructions 30cb may be particularized to an electronic document 30b by using a weighting scheme. Different levels of abstraction for the electronic document 30b may be created by weighting individual parts of the electronic document 30b according to their relative importance. Paragraphs may be weighted, for example, with weights ranging from 1 through 9, with 9 being a very important paragraph and 1 being a non-important paragraph. Each paragraph in the electronic document may be assigned a relative weight, according to a predetermined subjective decision on relative weights. Conversely, each paragraph may be weighed using a scoring method such as is disclosed in U.S. Pat. No. 5,638,543, et al., the disclosure of which is incorporated here by reference. A set of instructions for abstracting an electronic document may be particularized to an electronic document by including the predetermined weights for each paragraph of the electronic document. The particularized set of instructions 30d may be, for example, a list of the weights of each paragraph of electronic document 30b. The electronic document may be abstracted to one version of the electronic document by removing, for example, all paragraphs with assigned weights of 1. Similarly, a higher level of abstraction may be created for the electronic document by removing all paragraphs with assigned weights below 6, leaving paragraphs weighted 6, 7, 8, and 9. This weighting scheme may be used for different elements of the electronic document, such as sections, sentences, words, and the like. Also, the range of weights is not limited to any particular number of levels or numerical value for any individual weight.

A similar weighting approach may be used to distinguish elements of the electronic document in any manner of ways. For example, the elements of an electronic document may again be weighted with weights ranging from 1 to 9. These weights, however, are not representative of relative importance, but rather of subject matter. Assume that the electronic document is a year-end stock market summary. Level 8 may represent any element of the electronic document related to the computer industry. Level 7 may represent the textile industry and so forth. A user may then abstract the electronic document to his or her particular needs by eliminating undesired levels.

Figure 4:
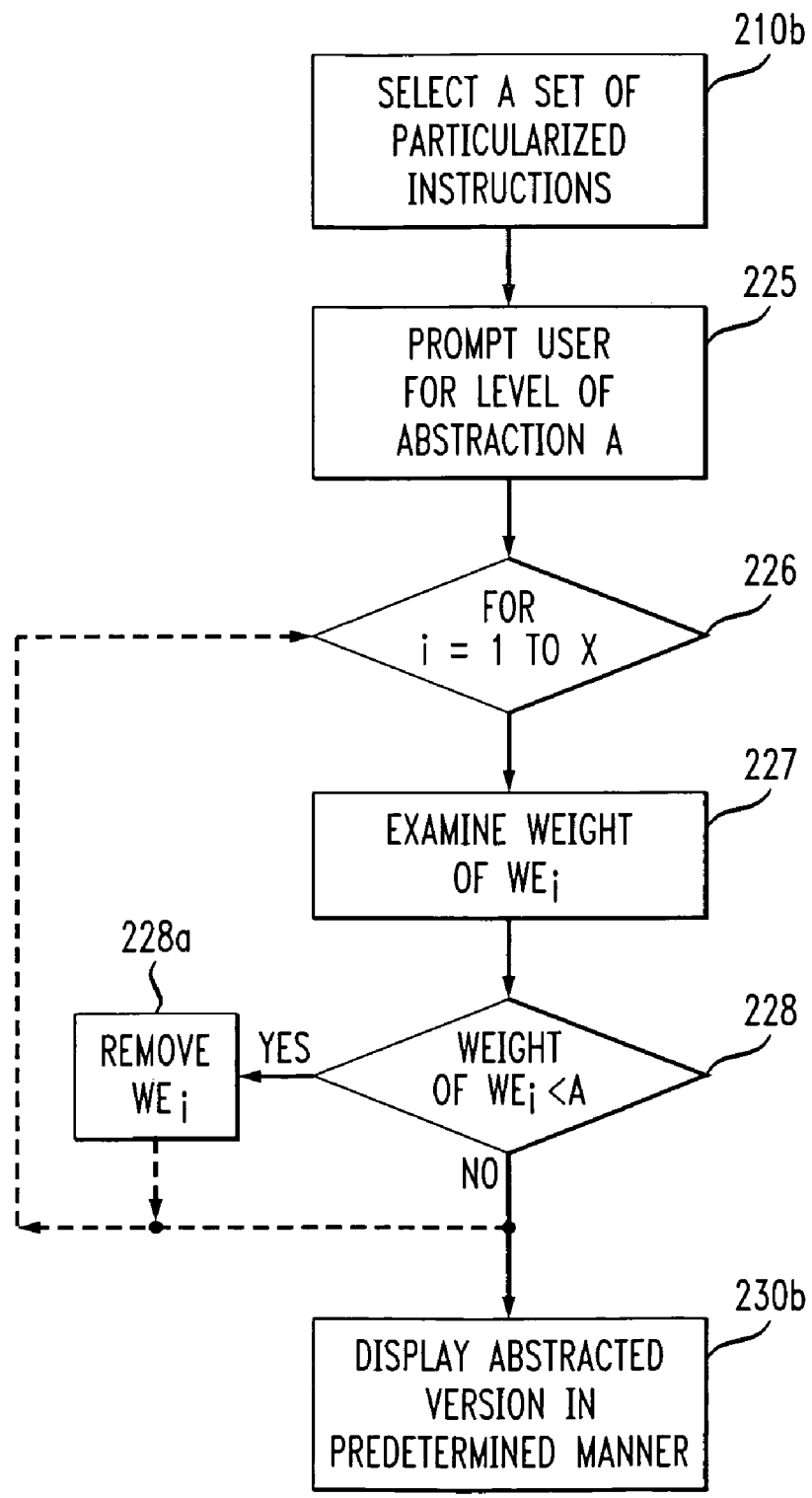
FIG. 4 is a flow chart of an exemplary method of particularized abstraction of an electronic document.

FIG. 4 is a flow chart showing the creation of an abstracted electronic document by executing a particularized set of instructions 30cb according to the invention. At step 210b, a set of particularized instructions is selected to be executed. At step 225, the user is prompted to select a level "A" of abstraction for the electronic document 30b. At step 226, a loop begins that is run for values of i from 1 to x, where "x" represent the total number of weighted elements ($WE_i$), such as sections, paragraphs, sentences, words and the like. At step 227, $WE_i$ is examined to determine its relative weight. The relative weights of each $WE_i$ are stored in the particularized set of instructions. At step 228, the relative weight of $WE_i$ is compared to input level A, and if the weight of $WE_i$ is less than A, $WE_i$ is removed from the electronic document at step 228a. The loop is continued until the end of the electronic document is reached (i.e., there are not more elements to be examined) and all weighted elements with relative weights less than the inputted level A are removed. The abstracted electronic document is outputted in a predetermined format at step 230b.

If in the method of FIG. 4, a user desires to use particular subject matter levels of an electronic document, such as in the above year-end market summary example, all levels besides the levels entered at step 225 are eliminated. If levels 7 and 8 are selected, then a user desires to abstract the electronic document by eliminating all elements other than elements related to the computer and textile industries. In this example, levels 1 through 6 and level 9 are removed, leaving the selected abstracted version.

The particularized set of instructions 30cb may be stored in separate file 30c as shown in FIG. 1. Since the set of instructions 30cb is particularized to an electronic document, for example electronic document 30b, the particularized set of instructions 30cb may be attached to the electronic document in a conventional manner, such as is common with electronic mail. The particularized set of instructions may exist, though, as a separate set of instructions 30cb that may be transmitted independent of the electronic document 30b. Indeed, there may be a plurality of particularized sets of instructions for one electronic document. For example, instruction set 30cb, instruction set 44cb, and instruction set 55cb may all be particularized to one electronic document, such as electronic document 30b, but represent different abstraction instructions.

The set of instructions 30c may include a description of the levels of abstraction for the electronic document capable of being created by executing a particularized set of instructions, such as 30cb. These descriptions may be used, for example, as prompts at step 225 of the method of FIG. 4, thereby informing a user of the significance of each level of abstraction and permitting a user to select a level analogous to his or her individual needs for the electronic document. A description of level 9 may disclose, for example, that the complete textual version will be outputted. A description of level 8 may disclose that all background paragraphs have been removed, and so forth. Similarly, in the year-end market summary example, the description may describe which market sectors correspond to each level.

Abstracted versions 44d of the electronic document 44b may be stored on storage device 40 of FIG. 1. The abstracted versions may be created using the methods as shown in FIGS. 2, 3, and 4. The abstracted versions of the electronic document may be recorded on any computer-readable medium, such as storage device 30, storage device 44, or storage device 55, and retrieved when selected by a user. Recording the abstracted versions of the electronic document, particularly when the abstracted versions may be accessed by several users, such as when the abstracted versions are made available on host server 40, LAN 50, or a wide area network, may save processing time because the versions do not have to be created each time that a request for an abstracted version of an electronic document occurs. Essentially, the abstracted version of the electronic document may be created by a user using the methods of FIGS. 2, 3, and 4 who desires to make a version of an electronic document available to other users. Then, when a user selects a version of an electronic document 55b from, for example LAN 50, the selected version from version 55d may be outputted rather that executing a set of instructions 55c with computer program 55a.

It should be understood that the computer program 30a implementing the method of abstracting an electronic document on hard drive 30 may be encoded in a computer data signal embodied in a carrier frequency wave. This computer data signal may be transferred to the computer 20 through a data line, such as when electronic information is sent from one computer to another over the Internet 100.

A means for storing an electronic document and a means for storing a set of instructions may be a CD-ROM, floppy diskette, hard drive, programmable-ROM, RAM, CD-RW drive, file server or their equivalents. Also, a means for outputting an abstracted version of the electronic document may be a computer monitor, printer, floppy diskette, hard drive, programmable-ROM, RAM, CD-RW drive, file server or their equivalents. Further, a means for abstracting the electronic document may be a machine capable of executing a set of instructions for abstracting the electronic document, such as a computer or its equivalent.

The present invention can be embodied in the form of methods and apparatus for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provided a unique device that operates analogously to specific logic circuits.

Although the invention has been described in terms of exemplary embodiments, it is not limited thereto. Rather, the appended claim should be construed broadly, to include other variants and embodiments of the invention which may be made by those skilled in the art without departing from the scope and range of equivalents of the invention.

What is claimed is:

1. A method of abstracting an electronic document comprising the following steps:
   prompting a user to select an abstracted version of the electronic document to be created from a plurality of abstracted versions available to be created;
   responsive to a selection by the user of the abstracted version to be created, creating the selected abstracted version of the electronic document by executing a set of instructions corresponding to the electronic document, wherein the instructions are, before said abstracted version is selected by the user, customized to the electronic document, the customization comprising a plurality of weights pre-assigned to respective portions of the electronic document to enable creation of said plurality of abstracted versions; and
   outputting the abstracted version of the electronic document in a predetermined format,
   wherein prior to said prompting step, said user selects a set of instructions for abstracting said electronic document from a plurality of sets of instructions for abstracting the electronic document, each of said sets of instruction being customized, before selection thereof, to said electronic document, each of said sets of instructions configured to enable creation of a plurality of different abstracted versions of said electronic document.

2. The method of claim 1, wherein the set of instructions further comprise a description of at least one abstracted version capable of being created by executing the set of instructions.

3. The method of claim 1, wherein the set of instructions are attached to the electronic document.

4. The method of claim 1, wherein the set of instructions comprise instructions for removing grammatical articles.

5. The method of claim 1, wherein the set of instructions comprise instructions for removing grammatical adverbs.

6. The method of claim 1, wherein the set of instructions comprise instructions for removing grammatical adjectives.

7. The method of claim 1, wherein the set of instructions comprise instructions for contracting verb clauses.

8. The method of claim 1, wherein said executing step comprises identifying a subset of said plurality of weights, said subset associated with said selected abstracted version to be created, and removing portions of said electronic document based on said subset.

9. A system for abstracting an electronic document comprising:
   means for prompting a user to select an abstracted version of the electronic document to be created from a plurality of abstracted versions available to be created;
   means for creating, responsive to a selection by the user of the abstracted version to be created, the selected abstracted version of the electronic document by executing a set of instructions corresponding to the electronic document, wherein the instructions are, before said abstracted version is selected by the user, customized to the electronic document, the customization comprising a plurality of weights pre-assigned to respective portions of the electronic document to enable creation of said plurality of abstracted versions; and
   means for outputting the abstracted version of the electronic document in a predetermined format,
   wherein prior to said prompting step, said user selects a set of instructions for abstracting said electronic document from a plurality of sets of instructions for abstracting the electronic document, each of said sets of instruction being customized, before selection thereof, to said electronic document, each of said sets of instructions configured to enable creation of a plurality of different abstracted versions of said electronic document.

10. The system of claim 9, wherein said executing step comprises identifying a subset of said plurality of weights, said subset associated with said selected abstracted version to be created, and removing portions of said electronic document based on said subset.

11. The system of claim 9, wherein the set of instructions are attached to the electronic document.

12. The system of claim 9, wherein the set of instructions comprise instructions for removing grammatical articles, removing grammatical adverbs or a combination thereof.

13. The system of claim 9, wherein the set of instructions comprise instructions for removing grammatical adjectives.

14. The system of claim 9, wherein the set of instructions comprise instructions for contracting verb clauses.

15. The system of claim 9, wherein the set of instructions further comprise a description of at least one abstracted version capable of being created by executing the set of instructions.

* * * * *